United States Patent [19]
Kemper et al.

[11] Patent Number: 4,517,468
[45] Date of Patent: May 14, 1985

[54] DIAGNOSTIC SYSTEM AND METHOD

[75] Inventors: Christian T. Kemper, Winter Park; Robert L. Osborne, Winter Springs; James C. Bellows, Maitland, all of Fla.

[73] Assignee: Westinghouse Electric Corp., Pittsburgh, Pa.

[21] Appl. No.: 605,703

[22] Filed: Apr. 30, 1984

[51] Int. Cl.³ .................. G06F 15/16; G06F 15/46
[52] U.S. Cl. .................................. 290/52; 364/492; 364/551
[58] Field of Search .................. 290/52; 187/29; 364/431.01, 492, 551; 371/20

[56] References Cited

U.S. PATENT DOCUMENTS 3,882,305 5/1975 Johnstone .................. 364/551
4,305,129 12/1981 Yannone et al. ............ 290/52 X
4,328,556 5/1982 Abe et al. .................. 364/492 X
4,410,950 10/1983 Toyoda et al. ............. 364/492 X
4,417,336 11/1983 Weilbacker .................. 371/20

Primary Examiner—S. J. Witkowski
Assistant Examiner—W. E. Duncanson, Jr.
Attorney, Agent, or Firm—D. Schron

[57] ABSTRACT

A diagnostic system wherein a central diagnostic center receives sensor data relative to the operating condition of a plurality of remote plants. Each plant records just certain sensor signals and transmits them at respective prescheduled transmisssion times. If certain activation limits are exceeded, a data link with the diagnostic center is immediately established so that the data may be transmitted ahead of its normally scheduled transmission time in order that an immediate diagnostic analysis be made on the plant. A communication link between the plant and diagnostic center is kept open for a predetermined period of time in which more data may be sent from the plant to the diagnostic center, and results and instructions, sent from the diagnostic center back to the plant. Such instructions may include the changing of certain parameters in the examination of the sensor signals.

14 Claims, 4 Drawing Figures

DIAGNOSTIC SYSTEM AND METHOD

BACKGROUND OF THE INVENTION

1. Field of the Invention

The invention in general relates to diagnostic apparatus, and particularly to apparatus which is constantly available for diagnosing a process for possible malfunctions.

2. Description of the Prior Art

The operating condition of various processes must be continuously monitored both from a safety and economic standpoint so as to obtain an early indication of a possible malfunction so that corrective measures may be taken.

Some processes, such as the generation of electricity in a power plant, utilize hundreds of sensors throughout the power plant to obtain on-line indications of operating parameters. A diagnostic system, responsive to the sensor outputs, may be provided at the plant to continuously interpret the sensor readings and provide the plant operator with an indication of the condition of the power plant equipment and to recommend any appropriate action which may be necessary from a safety or economic consideration.

The diagnosis may be performed by a digital computer containing a stored diagnostic program. In a preferred embodiment, recent developments dictate the use of computer programs known as knowledge-based expert systems which are rule-based systems containing a multitude of rules generated as a result of interviewing one or more diagnostic experts relative to a specific piece of equipment. As more information is obtained over a period of time, the program may be modified, if required, by adding, deleting, or modifying rules.

A typical plant may include hundreds of sensors, the output signals of which must be periodically scanned and stored. The scanning frequency for some sensors may be in terms of seconds while for others, may be in terms of minutes. Accordingly, the use of an expert or other diagnostic system with the requirement for an enormous amount of storage becomes prohibitively costly for some plants.

The present invention provides an arrangement whereby such plants may be continuously monitored for abnormal conditions at a fraction of the cost normally required for such operation.

SUMMARY OF THE INVENTION

A diagnostic system is provided for monitoring a process at a first location, the process including a plurality of sensors generating output signals relating to the operating conditions of the process. A first data storage means is located at the first location which additionally includes a computer means which operates to periodically scan the generated sensor output signals and place into the data storage means those signals which exhibit a predetermined difference from its value from a previous scan as well as those signals which exceed respective predetermined threshold values.

A diagnostic center situated at a second location remote from the first includes data storage and computer means operable to perform diagnostic analysis. A transmitter/receiver means at the first location is under the control of the computer means at the first location for transmitting the contents of the first data storage means to the diagnostic center at predetermined scheduled periods of time such as every hour on the hour. The apparatus is operable such that the contents of the first data storage means will be transmitted at an unscheduled period of time between normal transmissions whenever a signal exceeds its predetermined threshold.

The diagnostic center includes means to receive the data sent from the first location whereby a diagnostic analysis may be performed and results thereof transmitted back to the first location. In this manner a plurality of processes at different locations throughout the world may be simultaneously monitored by a sophisticated diagnostic analysis performed at a central diagnostic center.

DESCRIPTION OF THE PREFERRED EMBODIMENT

Although the diagnostic system of the present invention is applicable to the diagnosing of a multitude of processes either at stationary locations or even moving locations, it will be described by way of example with respect to a power plant, and more particularly to a steam turbine generator power plant.

Figure 1:
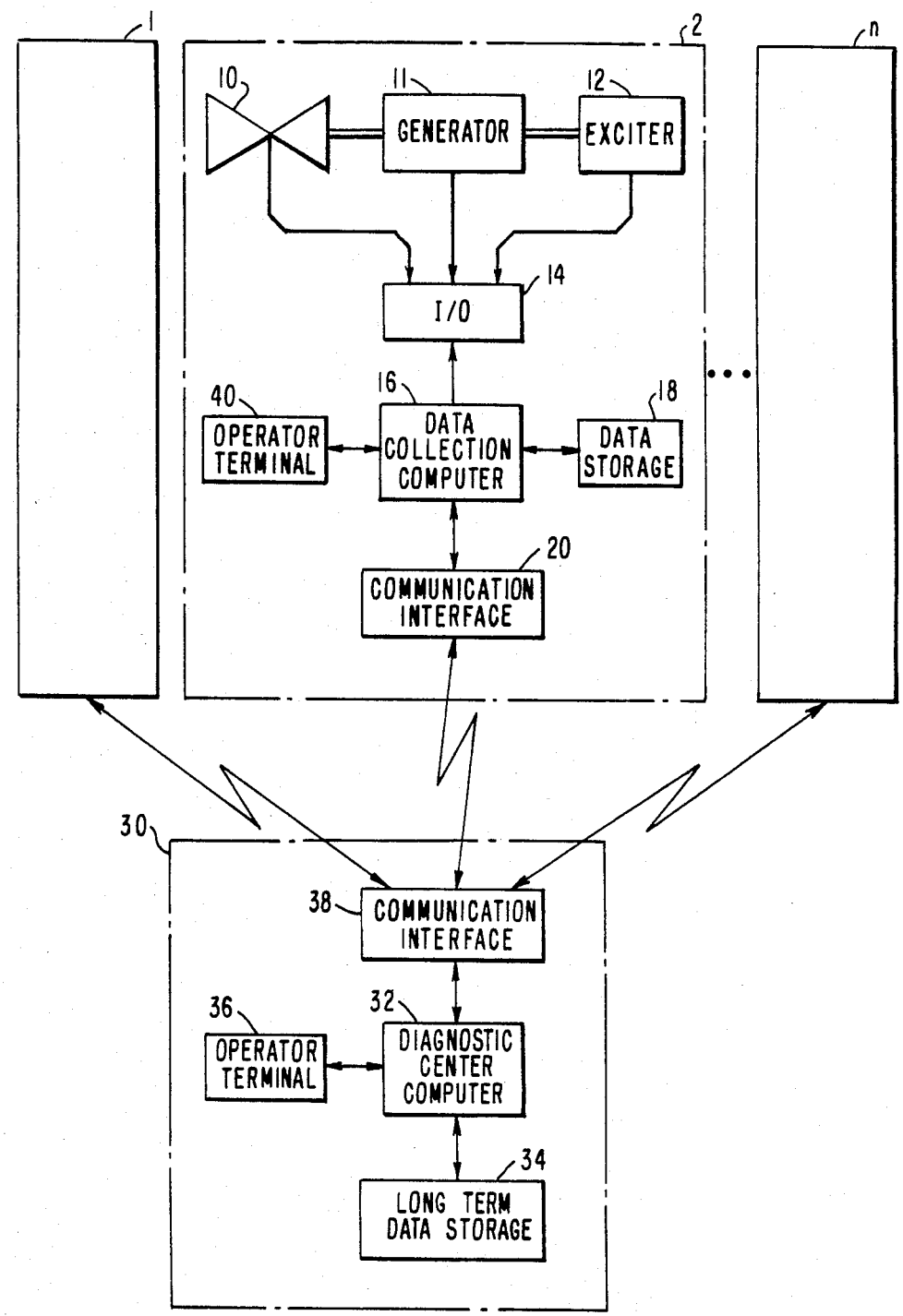
FIG. 1 is a block diagram of an embodiment of the present invention.

FIG. 1 illustrates a plurality of such power plants designated by the numerals 1, 2, . . . n, a typical one being illustrated by plant 2. The plant includes at least one steam turbine 10 operable to drive generator 11, supplied with excitation current from exciter 12. A typical plant includes a multitude of sensors such as for measuring turbine, generator and exciter temperatures at various locations in these units, as well as sensors for measuring pressure, vibration, speed, current, voltage, frequency, humidity, etc. Also included are a plurality of sensors in the steam loop for monitoring steam chemistry.

The plant at its location includes an input-output circuit 14 and a data collection computer 16 operable to periodically scan the output signals of all of the sensors and to store certain signals into a short-terms data storage 18.

Since the data storage capacity is somewhat limited at the plant, only certain signals provided by the sensors are stored. In accordance with standard practice, only those sensor signals which exceed a predetermined deadband are stored. That is, a sensor signal will be stored in data storage 18 if its value on one scan changes from its value from a previously stored scan by a predetermined amount.

In accordance with the present invention, a sensor signal is additionally stored if its value exceeds some predetermined positive or negative threshold level and if desired, signals can also be stored which exceed a predetermined rate limit. A sensor signal herein is meant not only an output from a single sensor but predetermined combinations of certain sensor signals, an average of n sensors being one example.

A transmitter/receiver means in the form of communication interface 20 is under control of computer 16 and is operable to periodically transmit the contents of data storage 18 to a distant diagnostic center 30. Such periodic transmission may be, for example, every hour in which case all the data collected since the previous transmission will be transmitted. If, however, one or more sensors exceeds the respective threshold level or rate limit, then the normal periodic transmission schedule will be interrupted such that contents of data storage 18 will be transmitted immediately in order that the diagnostic center perform an immediate analysis in the event that a dangerous condition is developing in the power plant.

In the event that no signal exceeds its predetermined deadband and no signal exceeds its predetermined threshold level or rate limit, a transmission of the data may still take place to indicate that the system is operating, although such data will be identical to that transmitted the previous hour.

The diagnostic center 30 includes the diagnostic center computer 32 as well as a long-term data storage 34 of sufficient capacity to store all or significant portions of the data transmitted from all of the plants. Computer 32 is operable to perform a diagnostic analysis on the received data and in one embodiment may embody an expert system type of program.

An operator's terminal 36 is included in order to access computer 32 and may include one or more displays as well as a keyboard for interactive control.

A transmitter/receiver means in the form of communication interface 38 is provided at the diagnostic center and is under control of computer 32 to receive the data transmitted from all of the plants on their respective periodic transmissions, as well as data transmitted in an unscheduled transmission. Results of the diagnosis as well as information including instructions may be transmitted back to the respective plant through the communication interface where they may be viewed on a display of the operator terminal 40.

In one embodiment, the communication interface may take the form of a modem whereby the data link is established via conventional telephone lines. Other data links are possible such as transmission via satellite from diagnostic center to plant, and vice versa, such satellite transmission being particularly useful when the plants and diagnostic center are located on different continents.

Figure 2:
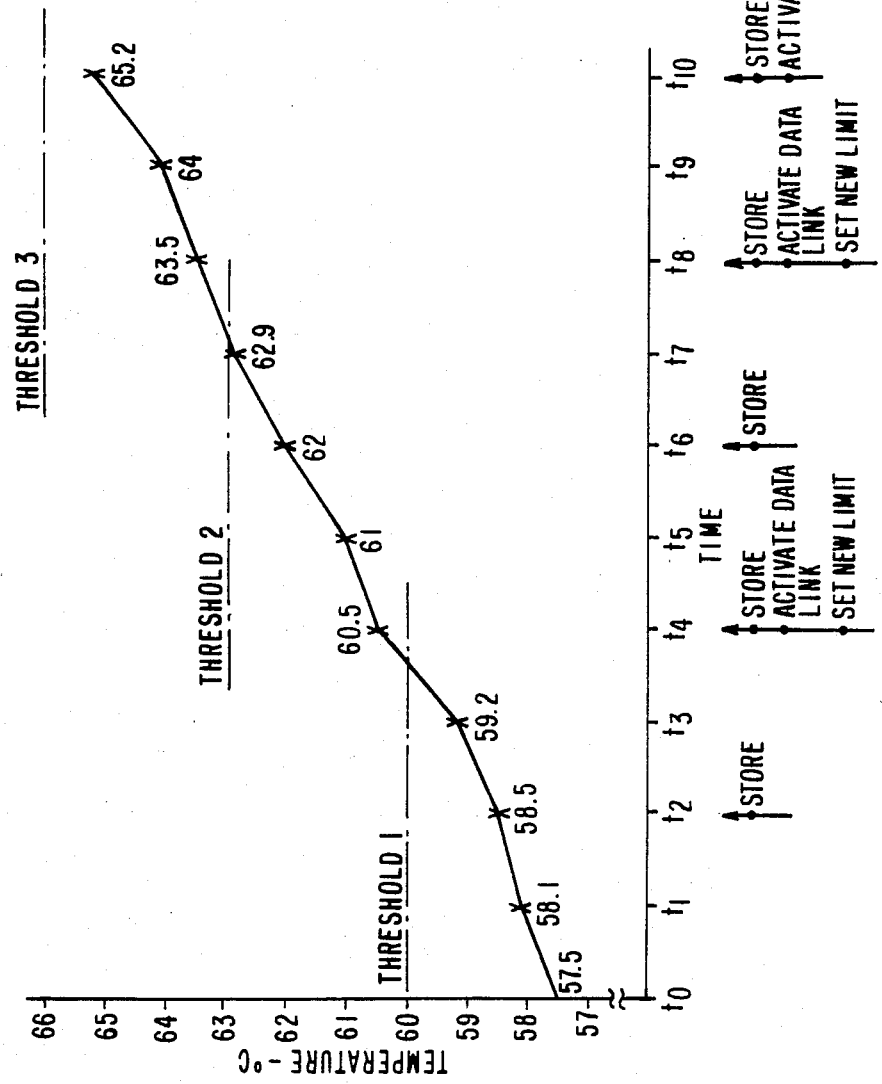
FIG. 2 is a curve illustrating the output of a typical process sensor.

Operation of the present invention will be described with respect to a single sensor in the form of a temperature sensor, the history of which is illustrated in FIG. 2 wherein temperature is plotted on the vertical axis and time is plotted on the horizontal axis.

Let it be assumed that the particular sensor is a thermocouple having an upper threshold level limit of 60° and a lower threshold level limit of 30°, where degrees are given in centigrade. The sensor has a rate limit of 20° per minute and a deadband of 1°.

With additional reference to FIG. 1, let it be assumed that prior to time $t_0$ the temperature stored in data storage 18 at the plant, for this particular sensor, was 57.4°. At $t_0$ the sensor output is scanned to reveal a temperature of 57.5°. Since the difference is only 0.1°, the value of 57.5° at time $t_0$ does not get stored because the difference does not exceed a preset deadband of 1°, by way of example. On the next scan, which, by way of example, may be 5 seconds later, the sensor output is read to reveal a temperature of 58.1° which compared with the previously stored temperature of 57.4° yields a difference of 0.7° and accordingly no storage takes place.

At time $t_2$ where the temperature is 58.5° a difference of 1.1° exists relative to the previously stored temperature of 57.4° and accordingly, the value of 58.5° as well as time $t_2$ are stored in data storage 18. The value of 58.5° now becomes the previously stored value for the subsequent reading of 59.2° at time $t_3$ with a difference of 0.7° resulting in no action taken. At time $t_4$, the temperature is 60.5° which compared with the previously stored temperature of 58.5° yields a difference of 2°. Two degrees exceeds the deadband of 1° and accordingly the time and temperature will be stored. In addition, the threshold level of 60° has been exceeded such that the data link between the plant and the diagnostic center will be activated and an immediate transmission of all the data in storage 18 will take place so that a diagnostic analysis may be performed by computer 32 at the diagnostic center.

Since the threshold level has been exceeded, the data collection computer 16 is operable to set a new threshold level. By way of example, the new threshold level is set at 3° higher than the old threshold level, or at 63°. It is to be also noted that in obtaining a value of 60.5° at time $t_4$, the rate limit of 20° per minute has been exceeded which would also dictate an immediate transmission of stored data.

Nothing occurs at time $t_5$ since no limits have been exceeded whereas at time $t_6$ the 1° deadband is exceeded and accordingly, the value of 62° is stored, as well as time $t_6$.

Nothing occurs at time $t_7$ where the temperature attains a value of 62.9°, while at time $t_8$ when the temperature reaches 63.5°, the deadband limit is exceeded as well as the second threshold level, dictating an immediate transmission of stored data to the diagnostic center. In addition, the data collection computer 16 assigns a new threshold level limit of 66°, 3° higher than the previously set threshold. From $t_8$ to $t_9$, the temperature increases by 0.5° and nothing occurs and at time $t_{10}$ when the temperature attains a value of 65.2°, storage of time and temperature takes place since the deadband has been exceeded. In addition, the rate limit of 20° per minute is exceeded dictating an immediate activation of the data link for transmission of stored information.

The following table provides a summary of the previously described operation:

TABLE

| Time | Temp. | Previously Stored Temp. | Difference | New Stored Temp. | Exceed Dead-Band | Exceed Threshold Level Limit | Exceed Rate Limit | Action |
|---|---|---|---|---|---|---|---|---|
| $t_0$ | 57.5 | 57.4 | 0.1 | 57.4 | No | No | No | (1) |
| $t_1$ | 58.1 | 57.4 | 0.7 | 57.4 | No | No | No | (1) |
| $t_2$ | 58.5 | 57.4 | 1.1 | 58.5 | Yes | No | No | (2) |
| $t_3$ | 59.2 | 58.5 | 0.7 | 58.5 | No | No | No | (1) |
| $t_4$ | 60.5 | 58.5 | 2.0 | 60.5 | Yes | Yes | Yes | (2)(3)(4) |
| $t_5$ | 61.0 | 60.5 | 0.5 | 60.5 | No | No | No | (1) |

TABLE-continued

| Time | Temp. | Previously Stored Temp. | Difference | New Stored Temp. | Exceed Dead-Band | Exceed Threshold Level Limit | Exceed Rate Limit | Action |
|---|---|---|---|---|---|---|---|---|
| $t_6$ | 62.0 | 60.5 | 1.5 | 62.0 | Yes | No | No | (2) |
| $t_7$ | 62.9 | 62.0 | 0.9 | 62.0 | No | No | No | (1) |
| $t_8$ | 63.5 | 62.0 | 1.5 | 63.5 | Yes | Yes | No | (2)(3)(4) |
| $t_9$ | 64.0 | 63.5 | 0.5 | 63.5 | No | No | No | (1) |
| $t_{10}$ | 65.2 | 63.5 | 1.7 | 65.2 | Yes | No | Yes | (2)(3) |

(1) Do nothing.
(2) Store time and temperaure.
(3) Activate data line to diagnostic center.
(4) Set new level limit.

Although a rising temperature of a single temperature sensor has been illustrated, it is understood that the principals apply equally to a falling temperature wherein new lower limits are set if an old lower limit is exceeded. Although a temperature sensor history is illustrated the same principals would apply to other sensors which may be scanned at periods equal to, less than, or greater than the five second scanning period illustrated in FIG. 2.

Figure 3:
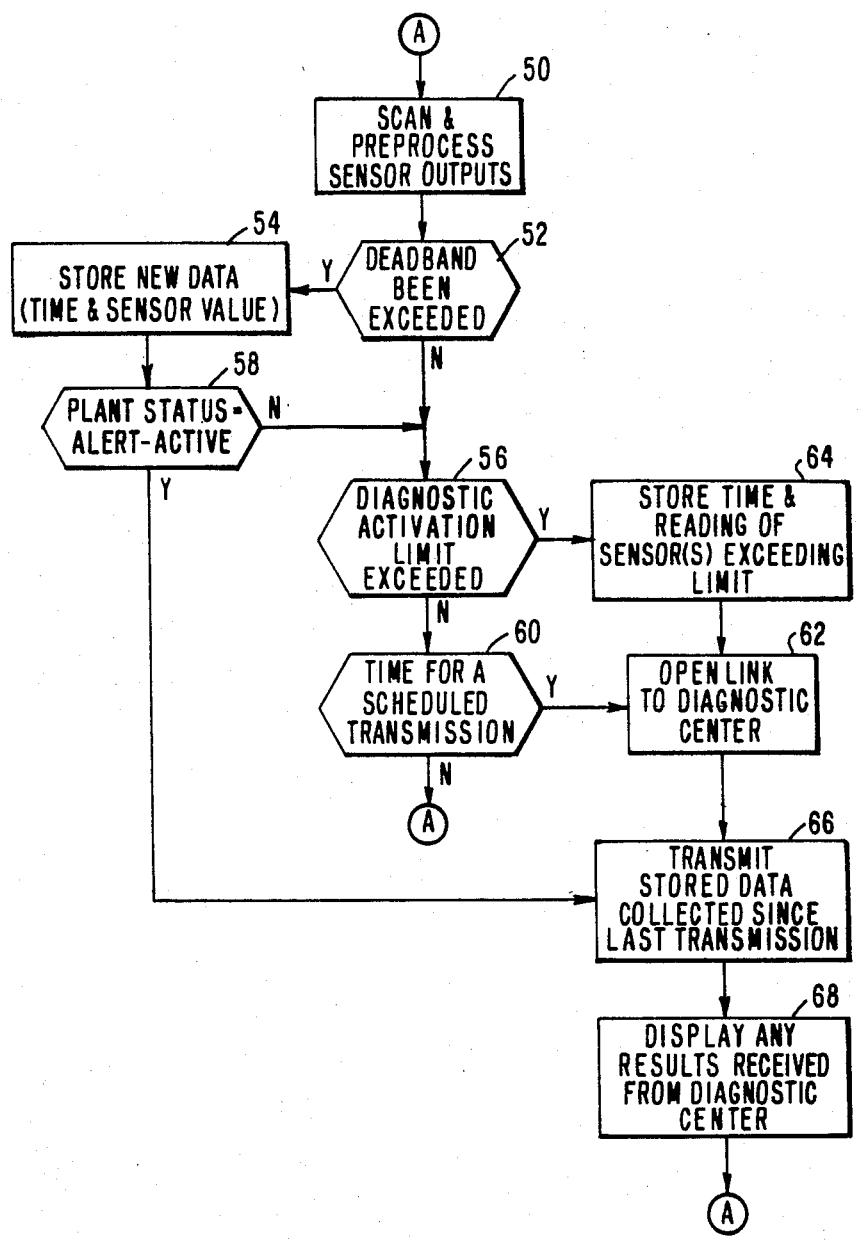
FIG. 3 is a flowchart illustrating operation of the system at the process location.

A flowchart of the operation of the data collection computer 16 at the plant 2 is illustrated in FIG. 3. The data collection computer 16 will, by operation of block 50, scan the various sensor outputs and do any necessary preprocessing on them, such preprocessing including signal conditioning, normalization, averaging, digital-to-analog conversion, conversion to engineering units to name a few. Each sensor signal is compared with the previously stored value for that particular sensor to see if the deadband assigned for that particular sensor has been exceeded. If it has, as indicated by decision block 52, the new value for that sensor is stored, as indicated by block 54, in the limited data storage 18. If the deadband has not been exceeded, then a decision is made, as indicated by decision block 56 as to whether or not any diagnostic activation limit is exceeded. This limit may be a threshold level limit or a rate limit as previously described. This process is also performed on data stored as a result of operation of block 54 in that if a plant is not on an ALERT-ACTIVE status, as indicated by decision block 58, then the stored data will be examined by decision block 56 to see if the diagnostic activation limit has been exceeded.

Decision block 60 determines whether or not it is time for a regularly-scheduled transmission, such as on the hour, and if not, the process repeats at A. If it is time for a scheduled transmission, a communication link to the diagnostic center is opened, as indicated by block 62. This link will also be opened if the results of decision block 56 indicate that a diagnostic activation limit has been exceeded in which case the time and value of the sensor or sensors exceeding the limit will be stored, as indicated by block 64.

Once the communication link has been opened, and as indicated by block 66, all the data stored since the last transmission will be sent to the diagnostic center for analysis. If the plant happens to be on an ALERT-ACTIVE status, then any new data stored as the result of operation of block 54 will be immediately transmitted as a result of operation of decision of block 58.

Once the diagnosis has been performed, the diagnostic center may transmit back to the plant information relating to plant status, actions to be taken by the plant operator, any changes to be made, etc. Accordingly, block 68 ensures that any results received from the diagnostic center will be displayed at the operator terminal 40 in the plant.

Figure 4:
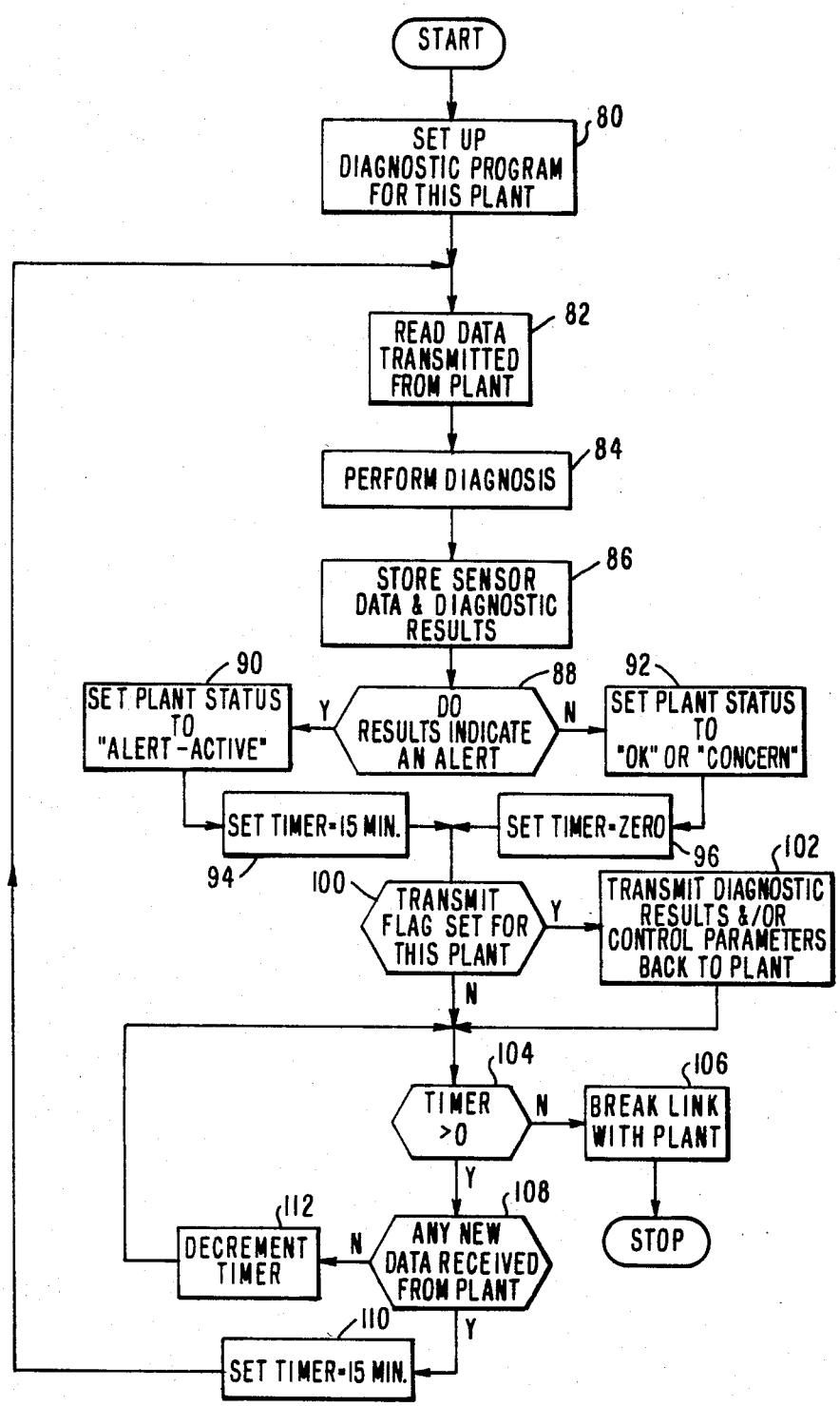
FIG. 4 is a flowchart illustrating operation of the system at the diagnostic center.

FIG. 4 represents a flowchart of the operation of the diagnostic center computer 32. Depending upon the type of plant and which plant is being diagnosed, block 80 will ensure that the proper diagnostic program or proper rule base for an expert system will be initialized. Data transmitted from a plant is received, as indicated by block 82 such that diagnostic analysis may be performed as indicated by block 84.

The results of the diagnostic analysis as well as the sensor data are stored by operation of block 86 and a decision is made, by decision block 88 whether or not an alert condition should be initiated as a result of the analysis. If the results so indicate, block 90 will set into motion the command to set the plant status to ALERT-ACTIVE. If an alert is not indicated, block 92 will set into motion the command to set the plant status to either an OK condition or a concern condition, by way of example.

Initially, a timer function is established within the computer and if an ALERT-ACTIVE condition is indicated, the timer will be set to some predetermined time period such as 15 minutes, as indicated by block 94. If the ALERT-ACTIVE status is not indicated, the timer will be set to zero as indicated by block 96.

Although the diagnostic results are available at the diagnostic center, authorization must be given to transmit the results back to the particular plant. A transmit bit may be set into the computer program and if the transmit bit, or flag, is set for the particular plant, as indicated by decision block 100 then the diagnostic results may be transmitted back to the plant as indicated by block 102. This transmission may not only contain the plant status, but as a result of the diagnosis, instructions may be transmitted to change certain parameters such as the deadband width or threshold or rate limit values. The results of the analysis may indicate that more data should be sent in which case the deadband may be narrowed or activation limits lowered. Conversely, if the results of the diagnosis indicate that nothing really is wrong and too much data is being sent, the deadband may be widened and activation levels increased.

If the transmit flag is not set for that particular plant, it may indicate that personnel at the diagnostic center may want to further review the matter prior to transmitting appropriate instructions. In either case, decision block 104 examines the timer to see if it is set to zero or greater than zero. If the timer is zero or has timed out to zero, the communication link with the plant may be broken, as indicated by block 106. If the timer is nonzero, decision block 108 determines whether or not any new data has been received from the plant and if it has, keeps the link opened for at least another 15 minutes by setting the timer as indicated by block 110. If no new data has been received, then the timer may be decremented by operation of block 112 and if no new data has been received for the 15 minute time period, the timer will be decremented to zero in which case the link with the plant will be broken.

Accordingly, a diagnostic system has been described wherein a single diagnostic center containing means for sophisticated diagnostic analysis may perform such analysis on one or a plurality of process plants located throughout the country or world. Each plant will have a relatively inexpensive data gathering system for periodic scheduled transmission to the diagnostic center and which periodic transmission will be interrupted upon the occurrence of certain conditions so as to perform an immediate transmission of certain data so as to minimize data transmissions and diagnostic processing while still providing accurate and timely diagnosis for each plant. The diagnostic center can remotely change any planned scheduled transmission period as well as other parameters such as deadband and activation limits so as to give the system flexible, centralized control of transmissions.

We claim:

1. A diagnostic system for monitoring a process at a first location, said process including a plurality of sensors generating output signals related to operating conditions of the process, comprising:
  (A) first data storage means at said first location;
  (B) first computer means at said first location operable to periodically scan said sensor output signals and place into said first data storage means those signals which exhibit a predetermined difference from its value from a previous scan and those signals which exceed respective predetermined threshold values;
  (C) a diagnostic center at a second location remote from said first location and including second data storage and second computer means operable to perform diagnostic analysis;
  (D) first transmitter/receiver means, under control of said first computer means, for transmitting the contents of said first data storage means, via a data link, to said diagnostic center at predetermined scheduled periods of time and for transmitting said contents at an unscheduled period of time whenever a signal exceeds its predetermined threshold;
  (E) said diagnostic center including second transmitter/receiver means, under control of said second computer means to receive data sent from said first location whereby said second computer means may perform said diagnostic analysis;
  (F) said second transmitter/receiver means being additionally operable to transmit, via said data link, information resulting from said analysis back to said first transmitter/receiver means;
  (G) said first transmitter/receiver means being additionally operable to receive said transmitted information.

2. A system according to claim 1 which includes:
  (A) display means at said first location for displaying said received transmitted information.

3. A system according to claim 1 wherein:
  (A) said contents of said first data storage means are transmitted upon the occurrence of a sensor signal exceeding a predetermined level threshold value.

4. A system according to claim 3 wherein:
  (A) said first computer means is operable to assign a new level threshold value when an old level threshold value is exceeded.

5. A system according to claim 1 wherein:
  (A) said contents of said first data storage means are transmitted upon the occurrence of a sensor signal exceeding a predetermined rate threshold.

6. A system according to claim 5 wherein:
  (A) said rate threshold is greater than said predetermined difference.

7. A system according to claim 1 wherein:
  (A) said first computer means is operable to change said predetermined difference in accordance with an instruction from said second computer means.

8. A system according to claim 1 wherein:
  (A) said data link is kept open for a predetermined period of time if the results of said diagnostic analysis indicates an abnormal condition.

9. A system according to claim 8 wherein:
  (A) said predetermined period of time in which said data link is kept open is less than the time period between scheduled transmissions of the contents of said first data storage means.

10. A system according to claim 8 wherein:
  (A) said data link means is automatically terminated if no new data has been transmitted during said predetermined period of time that said data link is kept open.

11. A system according to claim 1 wherein:
  (A) the results of said diagnostic analysis are first displayed at said second location prior to being transmitted back to said first location.

12. A system according to claim 1 wherein:
  (A) said process is the generation of electricity; and
  (B) said process includes at least one generator, an exciter for supplying excitation current to said generator and a steam turbine for driving said generator.

13. A system according to claim 12 which includes:
  (A) a plurality of sensors for measuring the operating condition of said generator;
  (B) a plurality of sensors for measuring the operating condition of said exciter; and
  (C) a plurality of sensors for measuring the operating condition of said steam turbine.

14. A system according to claim 1 which includes:
  (A) one or more other locations each remote from said diagnostic center;
  (B) each said other location including
    (i) data storage means;
    (ii) computer means operable to periodically scan the sensor output signals at that location and place into its data storage means those signals which exhibit a predetermined difference from its value from a previous scan and those signals which exceed respective predetermined threshold values; and
  (C) transmitter/receiver means, under control of said computer means for transmitting the contents of said data storage means, via a data link, to said diagnostic center at predetermined scheduled periods of time and for transmitting said contents at an unscheduled period of time whenever a signal exceeds its predetermined threshold.

* * * * *